(12) United States Patent
Wang et al.

(10) Patent No.: US 9,634,352 B2
(45) Date of Patent: Apr. 25, 2017

(54) METHOD FOR MAKING LITHIUM ION BATTERY

(71) Applicants: Jia-Ping Wang, Beijing (CN); Kai-Li Jiang, Beijing (CN); Shou-Shan Fan, Beijing (CN)

(72) Inventors: Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 143 days.

(21) Appl. No.: 13/662,718

(22) Filed: Oct. 29, 2012

(65) Prior Publication Data

US 2014/0013584 A1 Jan. 16, 2014

(30) Foreign Application Priority Data

Jul. 13, 2012 (CN) .................. 2012 1 02423548

(51) Int. Cl.
  *H01M 10/04* (2006.01)
  *H01M 4/36* (2006.01)
  (Continued)

(52) U.S. Cl.
  CPC ......... *H01M 10/049* (2013.01); *H01M 4/366* (2013.01); *H01M 4/625* (2013.01);
  (Continued)

(58) Field of Classification Search
  CPC .. H01M 10/0525; H01M 10/058; H01M 4/13; H01M 4/139; H01M 4/663;
  (Continued)

(56) References Cited

U.S. PATENT DOCUMENTS 6,488,721 B1 *  12/2002  Carlson ................. 29/623.5
2006/0177659 A1 *  8/2006  Chen et al. ............ 428/403
(Continued)

FOREIGN PATENT DOCUMENTS

| CN | 101479867 | 7/2009 |
| CN | 102084522 | 6/2011 |
| CN | 102208598 | 10/2011 |
| CN | 102306800 | 1/2012 |
| TW | 201227769 | 7/2012 |

OTHER PUBLICATIONS

Hyeokjo Gwon et al., Flexible energy storage devices based on graphene paper, Energy Environ. Sci., 2011, 4, 1277-1283.

*Primary Examiner* — Nicholas P D'Aniello
*Assistant Examiner* — Ling R Zeng
(74) *Attorney, Agent, or Firm* — Steven Reiss (57) ABSTRACT

A method for making lithium ion battery is provided. A cathode material layer and an anode material layer are provided. A cathode current collector is formed on a surface of the cathode material layer to obtain a cathode electrode. The cathode current collector includes a graphene layer and a carbon nanotube layer stacked with the graphene layer. An anode current collector is formed on a surface of the anode material layer to obtain an anode electrode. A separator is applied between the cathode electrode and the anode electrode thereby forming a battery cell. At least one battery cell is encapsulated in an external encapsulating shell. An electrolyte solution is injected into the external encapsulating shell.

12 Claims, 5 Drawing Sheets

(51) Int. Cl.
  *B82Y 30/00* (2011.01)
  *H01M 4/62* (2006.01)
  *H01M 10/052* (2010.01)
(52) U.S. Cl.
  CPC .............. *B82Y 30/00* (2013.01); *H01M 4/623* (2013.01); *H01M 10/052* (2013.01); *Y10T 29/49108* (2015.01)
(58) Field of Classification Search
  CPC .. H01M 10/049; H01M 10/052; H01M 4/366; H01M 4/623; H01M 4/625; B82Y 30/00; Y02E 60/122; Y10T 29/49108; Y02P 70/54
  USPC ...... 29/623.2, 623.1; 429/211, 212; 977/742
  See application file for complete search history.

(56) References Cited

U.S. PATENT DOCUMENTS

| | | | |
|---|---|---|---|
| 2008/0124629 A1* | 5/2008 | Rieck et al. | 429/209 |
| 2009/0325071 A1 | 12/2009 | Verbrugge et al. | |
| 2010/0140554 A1 | 6/2010 | Oki et al. | |
| 2010/0230641 A1* | 9/2010 | Oki et al. | 252/502 |
| 2010/0285352 A1* | 11/2010 | Juzkow et al. | 429/163 |
| 2011/0003207 A1* | 1/2011 | Oh et al. | 429/231.8 |
| 2012/0040145 A1* | 2/2012 | Zenasni et al. | 428/189 |
| 2012/0244430 A1* | 9/2012 | Yamazaki et al. | 429/211 |
| 2013/0045413 A1 | 2/2013 | Wang et al. | |
| 2013/0095389 A1* | 4/2013 | Bhardwaj et al. | 429/322 |
| 2013/0224590 A1 | 8/2013 | Divigalpitiya et al. | |
| 2014/0315083 A1 | 10/2014 | Liu et al. | |

* cited by examiner

FIG. 5

METHOD FOR MAKING LITHIUM ION BATTERY

RELATED APPLICATIONS

This application claims all benefits accruing under 35 U.S.C. §119 from China Patent Application No. 201210242375.X, filed on Jul. 13, 2012, in the China Intellectual Property Office, the disclosure of which is incorporated herein by reference. The application is also related to copending applications entitled, "METHOD FOR MAKING LITHIUN ION BATTERY", having Ser. No. of 13/628,237; "LITHIUM ION BATTERY", having Ser. No. of 13/662,727; "METHOD FOR MAKING LITHIUM ION BATTERY ELECTRODE", having Ser. No. of 13/662,768; "LITHIUM ION BATTERY ELECTRODE", having Ser. No. of 13/676,426; "METHOD FOR MAKING LITHIUM ION BATTERY", filed having Ser. No. of 13/630,004; "THIN FILM LITHIUM ION BATTERY", having Ser. No. of 13/685,802; "THIN FILM LITHIUM ION BATTERY", having Ser. No. of 13/685,803.

BACKGROUND

1. Technical Field

The present disclosure relates to a method for making lithium ion batteries.

2. Description of Related Art

A lithium ion battery includes a case, an anode, a cathode, a non-aqueous electrolyte, and a separator. The anode, cathode, non-aqueous electrolyte, and separator are encapsulated in the case. The separator is located between the anode and the cathode. The anode, cathode, and separator are infiltrated by the non-aqueous electrolyte. The cathode includes a cathode current collector and a cathode material layer disposed on a surface of the cathode current collector. The anode includes an anode current collector and an anode material layer disposed on a surface of the anode current collector.

The current collector is used to collect the charge generated by the lithium ion battery during discharge, and to connect to an external power source during the recharging of the lithium ion battery. The current collectors are usually made of metal foils, such as copper foil and aluminum foil. However, the metal foils have a relatively large weight. The power density is calculated by power/weight. Therefore, a large weight of the current collector will decrease the power density of a lithium ion battery. Furthermore, the metal foils may be corroded by the electrolyte, which decreases the life span of the lithium ion battery.

What is needed, therefore, is to provide a method for making a lithium ion battery, wherein the lithium ion battery has a high power density and a long life.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 1:
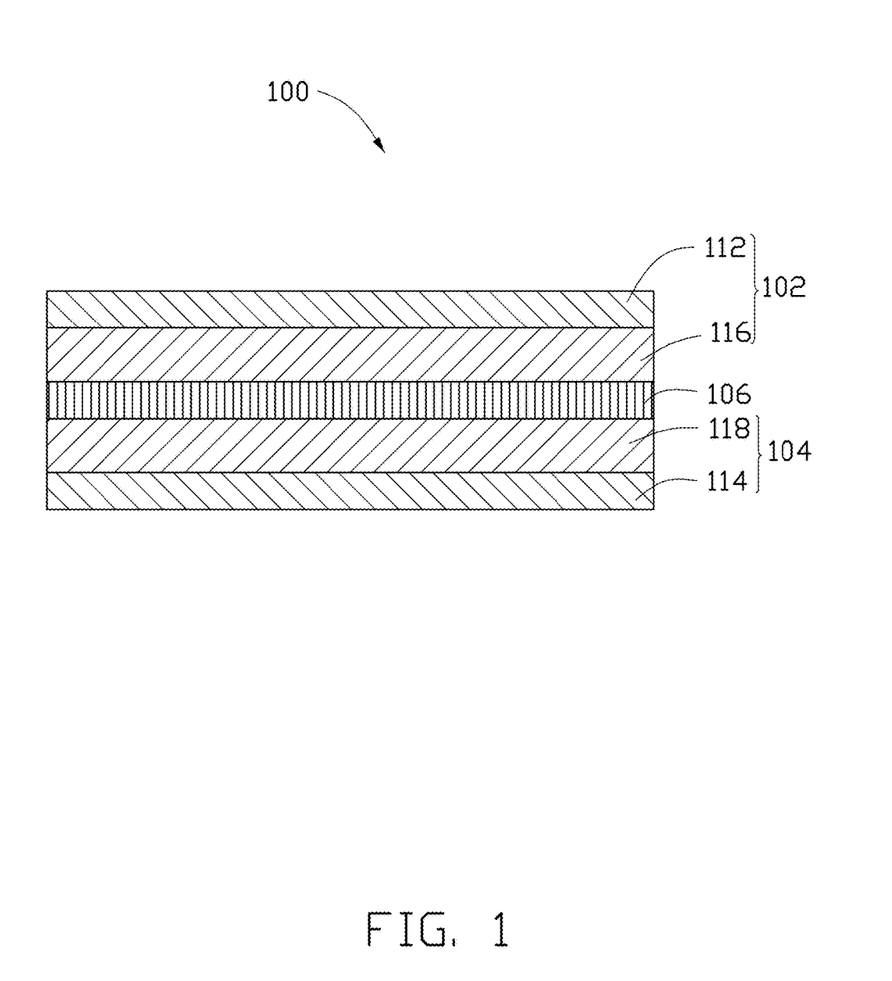
FIG. 1 is a schematic side view of an embodiment of a lithium ion battery.

Referring to FIG. 1, an embodiment of a lithium ion battery 100 includes a cathode electrode 102, an anode electrode 104, a separator 106, an electrolyte solution, and an external encapsulating shell (not shown). The cathode electrode 102, the anode electrode 104, the separator 106, and the electrolyte solution are encapsulated in the encapsulating shell. The cathode electrode 102 and the anode electrode 104 are stacked with each other and sandwich the separator 106. The cathode electrode 102 and the anode electrode 104 can be in contact with the separator 106. The cathode electrode 102, the separator 106, and the anode electrode 104 form a battery cell. The lithium ion battery 100 includes at least one battery cell. If the lithium ion battery 100 includes a plurality of battery cells that are stacked together. Adjacent battery cells are separated by a separator 106. In the embodiment according to FIG. 1, the lithium ion battery 100 includes one battery cell.

The cathode electrode 102 includes a cathode current collector 112 and a cathode material layer 116 disposed on at least one surface of the cathode current collector 112. The cathode current collector 112 and the cathode material layer 116 can be two separate layers. The anode electrode 104 includes an anode current collector 114 and an anode material layer 118 disposed on at least one surface of the anode current collector 114. The anode current collector 114 and the anode material layer 118 can be two separate layers. In one embodiment, the cathode electrode 102 includes two cathode material layers 116 and one cathode current collector 112 sandwiched between the two cathode material layers 116, and the anode electrode 104 includes two anode material layers 118 and one anode current collector 114 sandwiched between the two anode material layers 118. If the lithium ion battery 100 includes a plurality of battery cells, in every two adjacent battery cells, the cathode material layer 116 in one battery cell and the anode material layer 118 in the other battery cell face each other and sandwich the separator 106 therebetween.

The cathode electrode 102 can further include a cathode conducting tab (not shown) electrically connected with the cathode current collector 112. The anode electrode 104 can further include an anode conducting tab electrically connected with the anode current collector 114. A material of the cathode conducting tab or the anode conducting tab can be metal. After the cathode conducting tab electrically connects with the cathode current collector 112 or the anode conducting tab electrically connects with the anode current collector 114, a protecting layer can be coated on surfaces of the cathode conducting tab or the anode conducting tab to protect the cathode conducting tab or the anode conducting tab from being corroded by the electrolyte solution. A material of the protecting layer can be a polymer. The cathode conducting tab or the anode conducting tab is configured to connect the cathode current collector 112 or the anode current collector 114 with outside of the lithium ion battery 100.

At least one of the cathode current collector 112 and the anode current collector 114 includes a carbon nanotube layer and a graphene layer. The cathode current collector 112 or the anode current collector 114 can consist of the carbon nanotube layer and the graphene layer. When the cathode current collector 112 includes the carbon nanotube layer and the graphene layer, the anode current collector 114 can be a graphene layer, the carbon nanotube layer, or a metallic film. In one embodiment, both the cathode current collector 112 and the anode current collector 114 include the carbon nanotube layer and the graphene layer. The carbon nanotube layer and the graphene layer are stacked with each other. In one embodiment, the cathode current collector 112 includes the carbon nanotube located on a surface of the cathode material layer 116, and the graphene layer located on a surface of the carbon nanotube layer, that is, the carbon nanotube layer is sandwiched between the cathode material layer 116 and the graphene layer. In another embodiment, the cathode current collector 112 includes the graphene layer located on a surface of the cathode material layer 116, and the carbon nanotube layer located on a surface of the graphene layer, such that the graphene layer is sandwiched between the cathode material layer 116 and the carbon nanotube layer. In one embodiment, the anode current collector 114 includes the carbon nanotube layer located on a surface of the anode material layer 118, and the graphene layer located on a surface of the carbon nanotube layer, such that the carbon nanotube layer is sandwiched between the anode material layer 118 and the graphene layer. In another embodiment, the anode current collector 114 includes the graphene layer located on a surface of the anode material layer 118, and the carbon nanotube layer located on a surface of the graphene layer, such that the graphene layer is sandwiched between the anode material layer 118 and the carbon nanotube layer.

A thickness of the graphene layer can be less than 10 micrometers. In some embodiments, the thickness of the graphene layer is in a range from about 10 nanometers to about 200 nanometers. The graphene layer includes at least one graphene. The graphene is a one-atom-thick planar sheet of $sp^2$-bonded carbon atoms that are densely packed in a honeycomb crystal lattice. The size of the graphene can be very large (e.g., several millimeters). However, the size of the graphene is generally less than 10 micrometers (e.g., 1 micron). In one embodiment, the graphene layer is a pure structure of graphene, that is the graphene layer consists of graphenes. The graphene layer can be or include a single graphene or a plurality of graphenes. In one embodiment, the graphene layer includes a plurality of graphenes stacked with each other or located side by side. The plurality of graphenes is combined with each other by van der Waals attractive force. The graphene layer can be a continuous integrated structure. The term "continuous integrated structure" includes, but is not limited to, a structure that is combined by a plurality of chemical covalent bonds (e.g., $sp^2$ bonds, $sp^1$ bonds, or $sp^a$ bonds) to form an overall structure. A thickness of the graphene layer can be less than 1 millimeter. The graphene layer can be a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity.

The carbon nanotube layer includes a plurality of carbon nanotubes uniformly distributed therein. The carbon nanotubes in the carbon nanotube layer can be combined with each other by van der Waals attractive force therebetween. The carbon nanotube layer can be a pure structure of carbon nanotubes, that is, the carbon nanotube layer only includes carbon nanotubes. The carbon nanotubes can be disorderly or orderly arranged in the carbon nanotube layer. The term 'disorderly' describes the carbon nanotubes being arranged along many different directions, such that the number of carbon nanotubes arranged along each different direction can be almost the same (e.g. uniformly disordered), and/or entangled with each other. The term 'orderly' describes the carbon nanotubes being arranged in a consistently systematic manner, e.g., the carbon nanotubes are arranged approximately along a same direction and or have two or more sections within each of which the carbon nanotubes are arranged approximately along a same direction (different sections can have different directions). The carbon nanotubes in the carbon nanotube layer can be single-walled, double-walled, or multi-walled carbon nanotubes. The thickness of the carbon nanotube layer is not limited, and can be in a range from about 0.5 nanometers to about 1 centimeter. In one embodiment, the thickness of the carbon nanotube layer is in a range from about 1 micrometer to about 1 millimeter. The carbon nanotube layer can include at least one carbon nanotube film. In the carbon nanotube layer, more than one carbon nanotube film can be stacked together.

The carbon nanotube layer can include at least one drawn carbon nanotube film. The drawn carbon nanotube film includes a plurality of successive and oriented carbon nanotubes joined end-to-end by van der Waals attractive force therebetween. The carbon nanotubes in the carbon nanotube film can be substantially aligned in a single direction. The drawn carbon nanotube film can be formed by drawing a film from a carbon nanotube array that is capable of having a film drawn therefrom. The plurality of carbon nanotubes in the drawn carbon nanotube film are arranged substantially parallel to a surface of the drawn carbon nanotube film. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. A small number of the carbon nanotubes are randomly arranged in the drawn carbon nanotube film, and has a small if not negligible effect on the larger number of the carbon nanotubes in the drawn carbon nanotube film arranged substantially along the same direction. The drawn carbon nanotube film is capable of forming a free-standing structure. The term "free-standing structure" includes, but is not limited to, a structure that does not have to be supported by a substrate. For example, a free-standing structure can sustain the weight of itself when it is hoisted by a portion thereof without any significant damage to its structural integrity. So, if the drawn carbon nanotube film is placed between two separate supporters, a portion of the drawn carbon nanotube film not in contact with the two supporters, would be suspended between the two supporters and yet maintain film structural integrity. The free-standing structure of the drawn carbon nanotube film is realized by the successive carbon nanotubes joined end to end by van der Waals attractive force.

It can be appreciated that some variations can occur in the orientation of the carbon nanotubes in the drawn carbon nanotube film. Microscopically, the carbon nanotubes oriented substantially along the same direction may not be perfectly aligned in a straight line, and some curve portions may exist. It can be understood that a contact between some carbon nanotubes located substantially side by side and oriented along the same direction cannot be totally excluded. More specifically, the drawn carbon nanotube film can include a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The carbon nanotubes in the drawn carbon nanotube film are also substantially oriented along a preferred orientation. The drawn carbon nanotube film can be a pure structure only including the carbon nanotubes. The thickness of the drawn carbon nanotube film can be in a range from about 0.5 nanometers to about 100 micrometers. The width and length of the drawn carbon nanotube film is not limited. If the carbon nanotube layer includes a plurality of drawn carbon nanotube films, an angle between the aligned directions of the carbon nanotubes in at least two drawn carbon nanotube films can be in a range from about 0 degrees to about 90 degrees, such as about 0 degrees, 15 degrees, 45 degrees, 60 degrees, or 90 degrees.

In another embodiment, the carbon nanotube layer can include at least one flocculated carbon nanotube film formed by a flocculating method. The flocculated carbon nanotube film can include a plurality of long, curved, disordered carbon nanotubes entangled with each other. The length of the carbon nanotube film can be above 10 centimeters. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. Due to the carbon nanotubes in the flocculated carbon nanotube film being entangled with each other, the flocculated carbon nanotube film has excellent durability, and can be fashioned into desired shapes with a low risk to the integrity of the flocculated carbon nanotube film. The flocculated carbon nanotube film can be a free-standing structure due to the carbon nanotubes being entangled and adhered together by van der Waals attractive force therebetween. The thickness of the flocculated carbon nanotube film can range from about 1 micrometer to about 1 millimeter. It is also understood that many of the embodiments of the carbon nanotube structure are flexible and do not require the use of a structural support to maintain their structural integrity. The flocculated carbon nanotube film can be a pure carbon nanotube film that only includes carbon nanotubes.

In another embodiment, the carbon nanotube layer can include at least one pressed carbon nanotube film. The pressed carbon nanotube film can be formed by pressing a carbon nanotube array to slant the carbon nanotubes in the carbon nanotube array. The pressed carbon nanotube film can be a free-standing carbon nanotube film. The carbon nanotubes in the pressed carbon nanotube film are arranged along a same direction, along more than one predetermined different directions, or randomly arranged. The carbon nanotubes in the pressed carbon nanotube film can rest upon each other. Adjacent carbon nanotubes are attracted to each other and combined by van der Waals attractive force. An angle between a primary alignment direction of the carbon nanotubes and a surface of the pressed carbon nanotube film is about 0 degrees to approximately 15 degrees. In some embodiment, the angle is greater than 0 degrees and less than 15 degrees. The greater the pressure applied, the smaller the angle obtained. The thickness of the pressed carbon nanotube film can be in a range from about 1 micrometer to about 1 millimeter. The pressed carbon nanotube film can be pure carbon nanotube film only including carbon nanotubes. The length and width of the pressed carbon nanotube film depend on the carbon nanotube array that is pressed. If the length and width of the carbon nanotube array is relatively large, the pressed carbon nanotube film can have relatively large length and width.

The carbon nanotube layer and the graphene layer can combine with each other directly or via conductive adhesive. The carbon nanotube layer includes a plurality of micropores defined by adjacent carbon nanotubes, the graphene layer can cover the plurality of micropores. The carbon nanotube layer can be a supporter configured to support the graphene layer.

The cathode material layer 116 can include cathode active material, conductive agent, and adhesive. The cathode active material can be lithium manganate ($LiMn_2O_4$), lithium cobalt oxide ($LiCoO_2$), lithium nickel oxide ($LiNiO_2$) or lithium iron phosphate ($LiFePO_4$). The conductive agent can be acetylene black, carbon fiber or carbon nanotube. The adhesive can be polyvinylidene fluoride (PVDF) or polytetrafluoroethylene (PTFE). A thickness of the cathode material layer 116 can be in a range from about 100 micrometers to about 300 micrometers. In one embodiment, the thickness of the cathode material layer 116 is about 200 micrometers.

Figure 2:
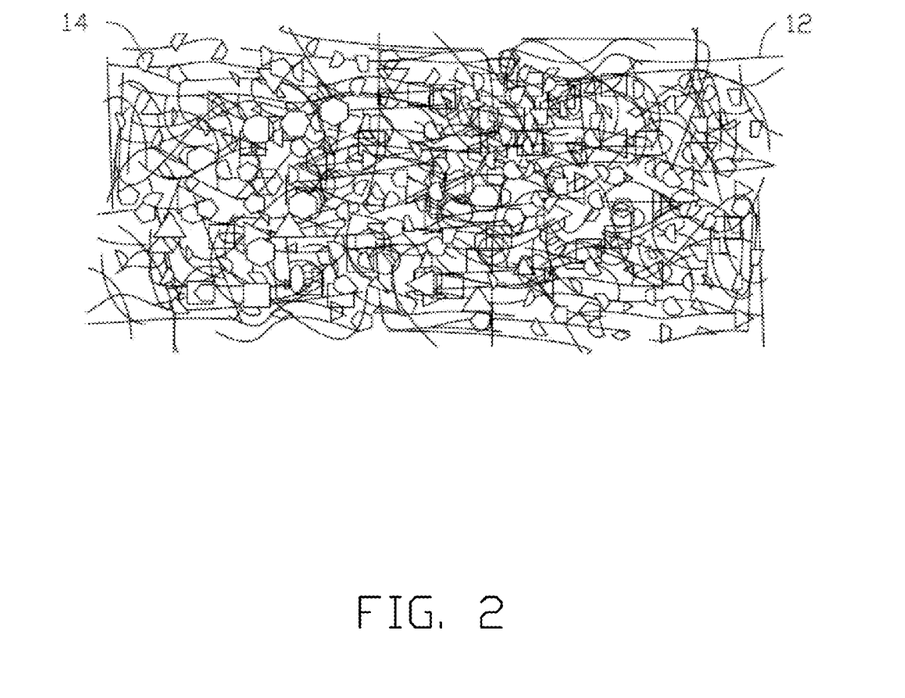
FIG. 2 is a structural schematic view of a lithium ion battery cathode.
Figure 3:
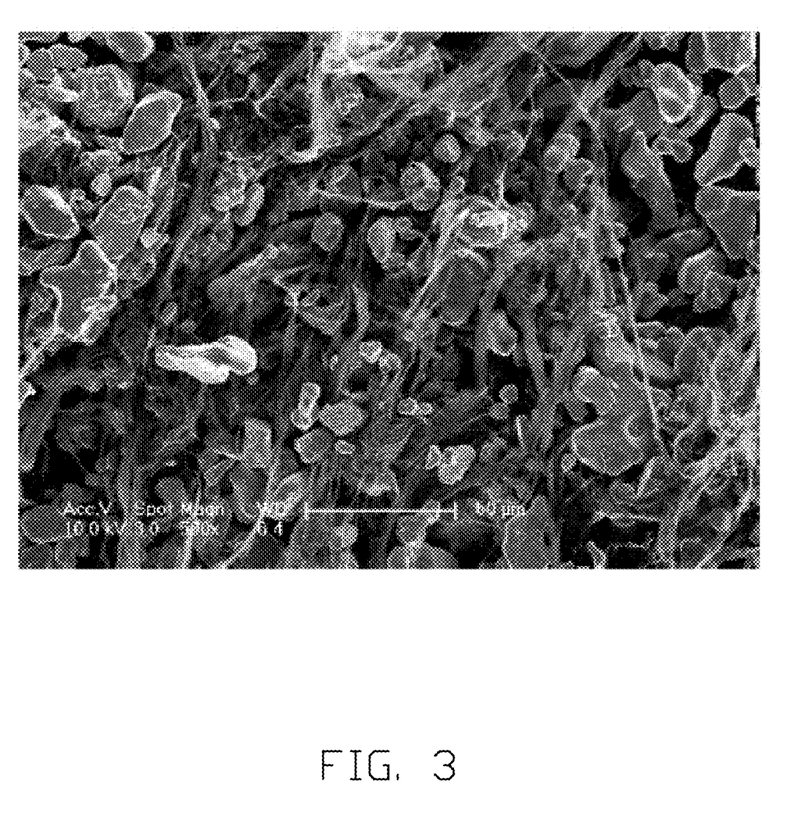
FIG. 3 is an SEM image of one embodiment of a lithium ion battery cathode.

In another embodiment, the cathode material layer 116 includes cathode active material and carbon nanotubes, e.g., the cathode material layer 116 is free of adhesive. The cathode material layer 116 can further include acetylene black, carbon fiber, or any other conductive agent. In the embodiment according to FIGS. 2 and 3, the cathode material layer 116 only includes cathode active material particles 14 and carbon nanotubes 12. A shape of the cathode active material particles 14 is not limited, and can be irregular or regular. A diameter of the cathode active material particles 14 is not limited, and can be less than 15 micrometers. In one embodiment, the cathode active material particles 14 can be lithium cobalt oxide particles having a diameter less than 15 micrometers. The carbon nanotubes 12 are entangled with each other and combined by van der Waals attractive force therebetween, thereby forming an integral continuous net structure having a plurality of micropores defined by the carbon nanotubes 12. The plurality of cathode active material particles 14 are dispersed in the net structure and attached on the surface of the carbon nanotubes 12. The carbon nanotube 12 is substantially pure, and has no impurities adhered thereon. The carbon nanotubes 12 in the lithium ion battery cathode 10 can serve as a conductive material and microporous carrier to support and fix the cathode active material particles 14. Thus, even without using an adhesive, the lithium ion battery cathode 10 can be an integrative stable structure due to the net structure composed of the carbon nanotubes 12. The cathode active material particles 14 are uniformly distributed in the net structure. Specifically, the cathode active material particles 14 can be adhered on or entangled by the carbon nanotubes, or the cathode active material particles 14 can be wrapped by the carbon nanotubes. The cathode active material particles 14 and the carbon nanotubes are in contact with each other without adhesive therebetween. The cathode active material particles 14 and the carbon nanotubes are fixed together by van der Waals attractive force therebetween. A length of the carbon nanotubes can be longer than 200 micrometers, and the carbon nanotubes can be entangled with each other to form the net structure. As such, the cathode active material particles 14 can be fixed by the net structure, and the cathode material layer 116 can be free of adhesive.

The anode material layer 118 can include anode active material, conductive agent, and adhesive. The anode active material can be natural graphite, pyrolysis carbon, or mesocarbon microbeads (MCMB). The conductive agent can be acetylene black, carbon fiber, or carbon nanotube. The adhesive can be PVDF or PTFE. A thickness of the anode material layer 118 can be in a range from about 50 micrometers to about 200 micrometers. In one embodiment, the thickness of the anode material layer 118 is about 100 micrometers.

In another embodiment, the anode material layer 118 includes anode active material and carbon nanotubes, e.g., the anode material layer 118 is free of adhesive. The anode material layer 118 can further include acetylene black, carbon fiber, or any other conductive agent. In one embodiment, the anode material layer 116 only includes anode active material particles and carbon nanotubes. A shape of the anode active material particles is not limited, and can be irregular or regular. A diameter of the anode active material particles is not limited, and can be less than 15 micrometers. The carbon nanotubes are entangled with each other and combined by van der Waals attractive force therebetween, thereby forming an integral continuous net structure having a plurality of micropores defined by the carbon nanotubes. The plurality of anode active material particles are dispersed in the net like structure and attached on the surface of the carbon nanotubes. The anode active material particles are uniformly distributed in the net structure. Specifically, the anode active material particles can be adhered on or entangled by the carbon nanotubes, or the anode active material particles can be wrapped by the carbon nanotubes. Thus, even without using adhesive, the anode material layer 118 can be an integrative stable structure due to the net structure composed of the carbon nanotubes, and the anode material layer 116 is free of adhesive.

The separator 106 can be similar to a conventional separator, such as a microporous polymer film, a microporous ceramic film, or combination thereof. A thickness of the separator 106 can be in a range from about 5 micrometers to about 60 micrometers. In some embodiments, the thickness of the separator 106 is in a range from about 15 micrometers to about 40 micrometers. The separator 106 includes a number of pores. A porosity of the separator 106 can be in a range from about 20% to about 90%, diameters of the pores of the separator 106 is in a range from about 0.1 micrometers to about 80 micrometers. In some embodiments, the porosity is in a range from about 40% to 80%, diameter is in a range from about 0.1 micrometers to about 10 micrometers. The electrolyte solution can include an electrolyte and an organic solvent. The electrolyte can be lithium hexafluorophosphate ($LiPF_6$), lithium terafluoroborate ($LiBF_4$), lithium bis(oxalato)borate (LiBOB), or combinations thereof. The organic solvent can be ethylene carbonate (EC), diethyl carbonate (DEC), dimethyl carbonate (DMC), ethylmethyl carbonate (EMC), propylene carbonate (PC), or combinations thereof.

The external encapsulating shell can be a rigid battery shell or a soft encapsulating bag. The conductive tabs are exposed to outside of the external encapsulating shell, thereby connecting the external circuit.

The cathode current collector 112 and/or the anode current collector 114 including the graphene layer and the carbon nanotube layer, has relatively good conductivity, stable chemical and electrical stability, and low weight. As such, the lithium ion battery 100 has a high power density and long lifespan.

Figure 4:
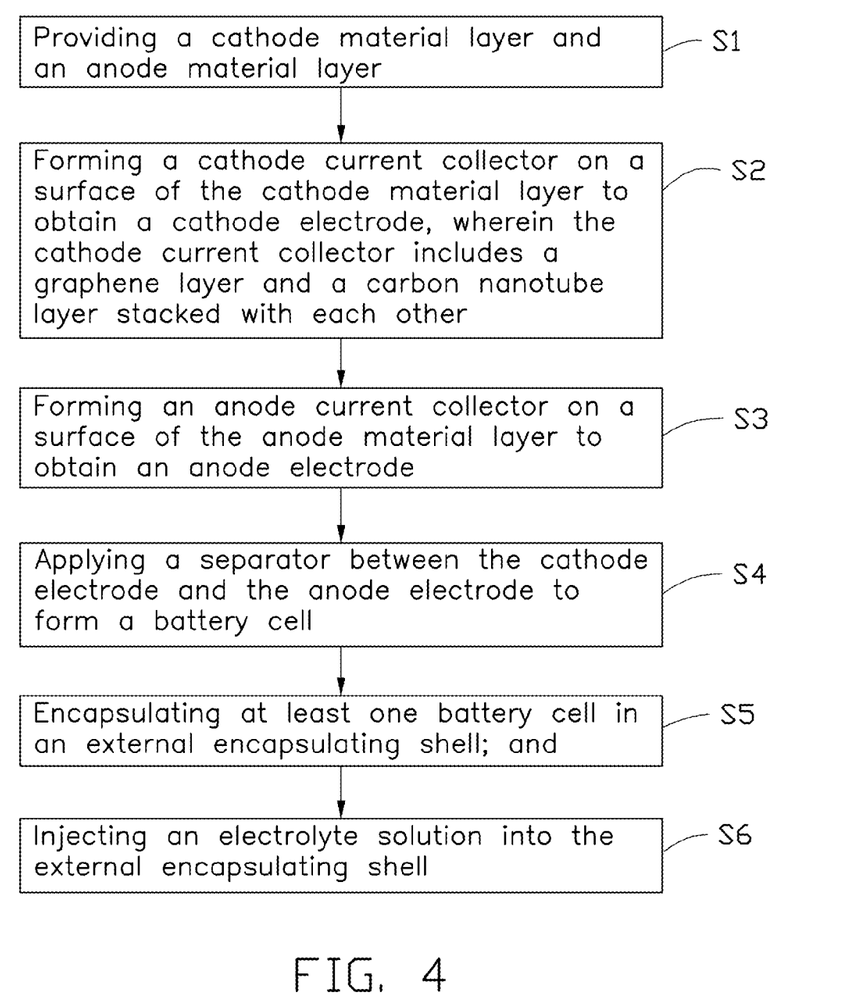
FIG. 4 is a flowchart for making a lithium ion battery according to one embodiment.

Referring to FIG. 4, a method for making a lithium ion battery is provided. The method includes the following steps:

S1: providing a cathode material layer and an anode material layer;

S2: forming a cathode current collector on a surface of the cathode material layer to obtain a cathode electrode, wherein the cathode current collector includes a graphene layer and a carbon nanotube layer stacked with each other;

S3: forming an anode current collector on a surface of the anode material layer to obtain an anode electrode;

S4: applying a separator between the cathode electrode and the anode electrode, thereby forming a battery cell;

S5: encapsulating at least one battery cell in an external encapsulating shell; and S6: injecting an electrolyte solution into the external encapsulating shell.

In step S1, a method for making the cathode material layer is not limited. In one embodiment, the cathode material layer is formed by the following sub-steps:

S11: making a carbon nanotube source including a number of carbon nanotubes;

S12: providing a cathode active material including a number of cathode active material particles and a solvent;

S13: adding the carbon nanotube source and the cathode active material into the solvent, and shaking the solvent with the carbon nanotube source and the cathode active material with ultrasonic waves; and S14: separating the carbon nanotube source and the cathode active material from the solvent to obtain the cathode material layer.

In step S11, the carbon nanotube source can be made of carbon nanotubes. The carbon nanotubes can be single-walled carbon nanotubes, double-walled carbon nanotubes, or multi-walled carbon nanotubes. The carbon nanotubes can be pure, meaning there is few or no impurities adhered on surface of the carbon nanotubes. In some embodiments, there are no functional groups attached on the carbon nanotubes. A length of the carbon nanotubes can be the same or different. The length of the carbon nanotubes can be longer than 300 micrometers. In one embodiment, the lengths of the carbon nanotubes are substantially the same. A method for making the carbon nanotube source can include providing a carbon nanotube array, wherein the carbon nanotube array can be formed on a substrate, and scratching the carbon nanotube array from the substrate to form the carbon nanotube source. The carbon nanotube source obtained directly from the carbon nanotube array can make the lithium ion battery cathode stronger. In one embodiment, the carbon nanotube array is a super aligned carbon nanotube array. A method for making the carbon nanotube array can be by CVD method, arc discharge method, aerosol method, or any other appropriate method.

In the step S12, the solvent can be ethanol, glycol, acetone, N-Methyl-2-pyrrolidone, water, or combination thereof. In one embodiment, the solvent is ethanol. The solvent is contained in a container, such as a beaker.

In the step S13, the carbon nanotube source and the cathode active material form a mixture. A weight percentage of the carbon nanotubes in the mixture can be in a range from about 0.1% to about 20%. In some embodiments, the weight percentage of the carbon nanotubes can be in a range from about 1% to about 10%. A power of the ultrasonic wave can be in a range from about 400 W to about 1500 W. In some embodiments, the power is in a range from about 800 W to about 1000 W. A time of shaking with the ultrasonic wave can range from about 2 minutes to about 30 minutes. In some embodiments, the shaking time ranges from about 5 minutes to about 10 minutes. The solvent with the carbon nanotube source and the cathode active material can be shaken with ultrasonic waves continuously or at intervals.

In step S14, after the solvent with the carbon nanotube source and the cathode active material is shaken, the carbon nanotubes in the carbon nanotube source and the cathode active material particles in the cathode active material combine with each other to form a mixture. The mixture includes or consists of the carbon nanotubes and cathode active material particles. The solvent with the mixture is kept still for about 1 minute to about 20 minutes. The mixture will deposit to the bottom of the container. After the solvent with the carbon nanotube source and the cathode active material is shaken, the carbon nanotubes entangled with each other to form a net structure. The cathode active material particles are wrapped by the net structure and attached on the surface of the carbon nanotubes to form an integrity mixture. The cathode active material particles have a larger density than the solvent, and as such, the integrity mixture can be deposited to the bottom of the container. After the mixture has deposited to the bottom of the container, the solvent can be absorbed from the container by a pipette, thereby separating the mixture from the solvent. After the carbon nanotube source and the cathode active material are separated from the solvent, the mixture of the carbon nanotube source and the cathode active material can be dried at a room temperature or at a temperature from about 25 degrees centigrade to about 80 degrees centigrade. After the mixture is dried, the mixture can be cut directly to form the lithium ion battery cathode. In other embodiments, the mixture can be pressed and then cut to form the lithium ion battery cathode. The cathode material layer made by the above method only consists of carbon nanotubes and cathode active material particles. The carbon nanotubes are used as conductors to improve the conductivity of the cathode material layer.

In step S1, a method for making the anode material layer is not limited. In one embodiment, the method for making the anode material layer is similar to the method for making the cathode material layer, except anode active material is used instead of cathode active material. The anode material layer made by the above method consists of carbon nanotubes and anode active material particles. The carbon nanotubes are used as conductors to improve the conductivity of the anode material layer.

In step S2, the graphene layer and the carbon nanotube layer are formed on a surface of the cathode material layer. A method of forming the graphene layer and the carbon nanotube layer on the surface of the anode material layer includes steps of:

S21: making a graphene layer;
S22: attaching the graphene layer on a surface of the anode material layer; and
S23: applying a carbon nanotube layer on a surface of the graphene layer.

In step S21, a method for making the graphene layer includes the following steps:

S21a, providing a metal substrate having a surface;
S21b, disposing the metal substrate in a reacting chamber;
S21c, heating the metal substrate to a predetermined temperature; and
S21d, supplying a carbon source gas into the reacting chamber, thereby forming the first graphene layer on the surface of the metal substrate.

In step S21a, the metal substrate can be a metal foil with a thickness in a range from about 100 nanometers to about 100 micrometers. A material of the metal substrate 100 can be copper or nickel. A shape of the metal substrate is not limited. An area of the metal substrate can be set according to the volume of the chamber used to grow the first graphene layer by the CVD method. The metal substrate can be rolled up and placed in the chamber to grow the first graphene layer with a large area. In one embodiment, the metal substrate is a copper foil with a thickness of about 25 micrometers.

In step S21b, the reacting chamber can provide a reaction space for forming the first graphene layer. The reacting chamber can have a sealed cavity. The reacting chamber includes a gas inlet and a gas outlet. The gas inlet is used to input a reaction gas. The gas outlet is connected with an evacuating device. The evacuating device can be used to adjust the pressure in the reacting chamber. Furthermore, the reacting chamber can include a water cooling device to adjust the temperature in the reacting chamber. The reacting chamber can be a quartz tube furnace. An area of the metal substrate can be adjusted according to the volume of the reacting chamber. The metal substrate with a relatively large area can be bent or curved so that it can be placed in the reacting chamber.

In step S21c, the surface of the metal substrate is heated to become flatter. The flatter the surface, the easier to form the first graphene layer on the surface of the metal substrate. The reacting chamber is evacuated before heating the metal substrate. In one embodiment, hydrogen gas can be imported in the reacting chamber through the gas inlet before heating the metal substrate. The hydrogen gas can reduce an oxide layer on the surface of the metal substrate, and can further prevent the metal substrate from oxidizing. A flow rate of the hydrogen gas can be in a range from about 2 standard cubic centimeters per minute (sccm) to about 35 sccm. A heating temperature can be in a range from about 800° C. to about 1500° C. A heating period can be in a range from about 20 minutes to about 60 minutes. A pressure in the reacting chamber can be in a range from about 0.1 Pa to about 100 Pa. In one embodiment, the flow rate of the hydrogen gas is about 2 sccm, the pressure of the reacting chamber is about 13.3 Pa, the heating temperature is about 1000° C., a temperature rising period is about 40 minutes, and the constant temperature period at the heating temperature is about 20 minutes.

In step S21d, carbon atoms can be deposited on the surface of the metal substrate, thereby forming the first graphene layer composed of carbon atoms. The hydrogen gas is continuously imported through the gas inlet during the process of growing the first graphene layer. The flow rate of the hydrogen gas, while supplying the carbon source gas into the reacting chamber, is the same as that of the step S23. A ratio between the flow rate of the carbon source gas and the hydrogen gas is in a range from about 45:2 to about 15:2. The carbon source gas can be at least one of methane, ethane, ethylene, or acetylene. While supplying the carbon source gas, the temperature in the reacting chamber can be in a range from about 800° C. to about 1500° C. with a constant temperature period in a range from about 10 minutes to about 60 minutes. A pressure in the reacting chamber can be in a range from about $10^{-1}$ Pa to about $10^2$ Pa. In one embodiment, the pressure of the reacting chamber is about 66.5 Pa, the temperature of the reacting chamber is about 1000° C., the flow rate of the carbon source gas is about 25 sccm, the carbon nanotube gas is methane, and the constant temperature period is about 30 minutes.

In step S21d, the metal substrate can be cooled after forming the first graphene layer thereon. While cooling the metal substrate, the carbon source gas and the hydrogen gas can continuously flow into the reacting chamber. The flow rate of the carbon source gas and the hydrogen gas and the pressure of the reacting chamber are constant. In one embodiment, the metal substrate is cooled for about 1 hour. After cooling the metal substrate, the metal substrate with the first graphene layer grown thereon is taken out of the reacting chamber. The graphene layer can be separated from the metal substrate.

In step S22, after the graphene layer is separated from the metal substrate, the first graphene layer is attached on a surface of the cathode material layer to form the cathode electrode.

In step S23, a carbon nanotube layer can be provided directly and attached on the surface of the graphene layer, and sandwich the graphene layer between the cathode material layer and the carbon nanotube layer. In one embodiment, the carbon nanotube layer is a pressed carbon nanotube film, and a method for applying the carbon nanotube layer on the surface of the graphene layer includes:

S23a: providing a carbon nanotube array;

S23b: transferring the carbon nanotube array to the surface of the graphene layer; and S23c: pressing the carbon nanotube array.

In step S23a, the method for making the carbon nanotube array is not limited. In one embodiment, the carbon nanotube array is formed on a substrate by CVD method.

In step S23b, the carbon nanotube array is transferred on the surface of the graphene layer by covering the substrate with the carbon nanotube array on the surface of the graphene layer, wherein the carbon nanotube array is sandwiched between the substrate and the graphene layer.

In step S23c, a pressure can be applied on the substrate to press the carbon nanotube array onto the surface of the graphene layer. The substrate can be separated from the carbon nanotube array, and at least part of the carbon nanotubes in the carbon nanotube array stays on the surface of the graphene layer to form the carbon nanotube layer. The substrate can be separated from the carbon nanotube array by applying a thin sheet between the carbon nanotube array and the substrate, and then removing the substrate to make the carbon nanotube array stay on the surface of the graphene layer to form the carbon nanotube layer. After the substrate is removed, the carbon nanotube array remaining on the surface of the graphene layer can be further pressed.

In step S3, the anode current collector can include a graphene layer and a carbon nanotube layer, and is formed on a surface of the anode material layer. The method for making the anode current collector on the surface of anode material layer is similar to the method of making the cathode current collector on the surface of the cathode material layer.

The above step S4 can further include the sub-step of pressing the battery cell using a laminator.

Figure 5:
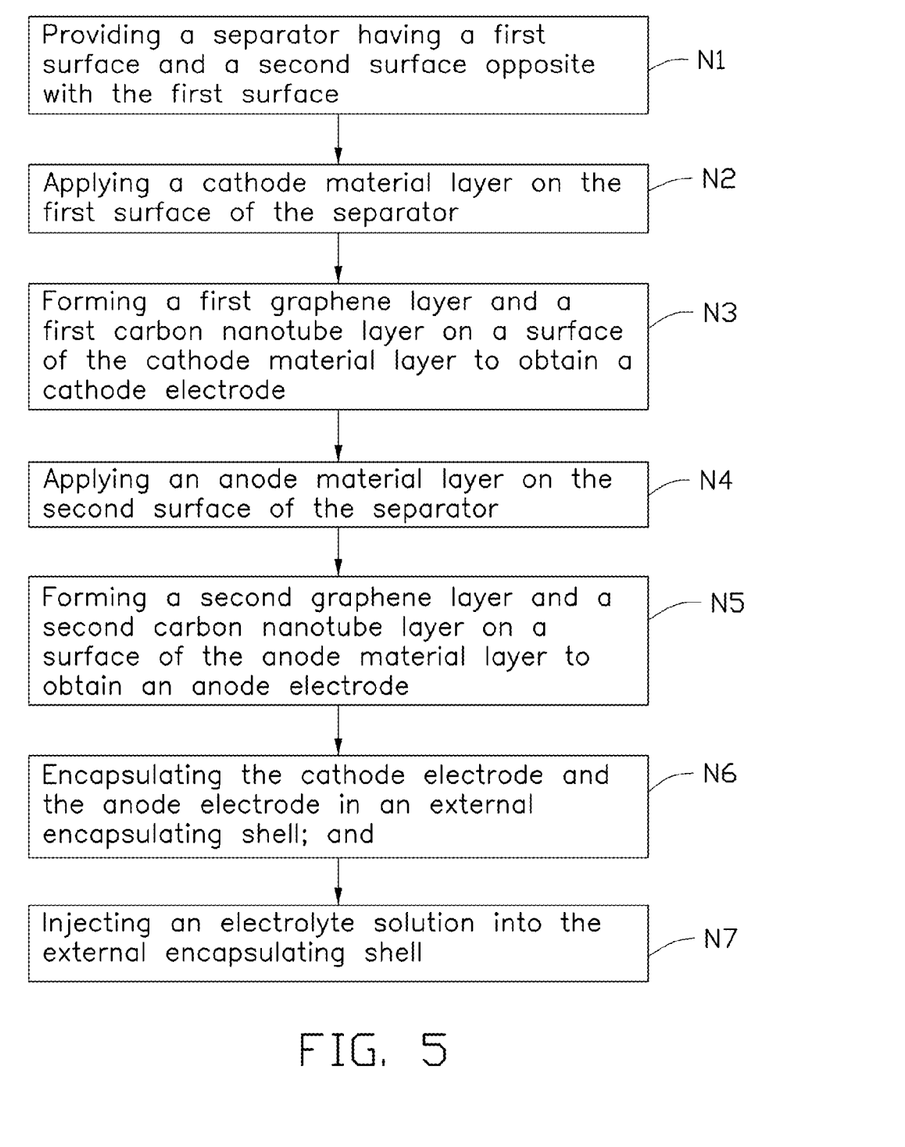
FIG. 5 is a flowchart for making a lithium ion battery according to another embodiment.

Referring to FIG. 5, another embodiment of making the lithium ion battery includes the following steps:

N1: providing a separator having a first surface and a second surface opposite to the first surface;

N2: applying a cathode material layer on the first surface of the separator;

N3: forming a first graphene layer and a first carbon nanotube layer on a surface of the cathode material layer to obtain a cathode electrode;

N4: applying an anode material layer on the second surface of the separator;

N5: forming a second graphene layer and a second carbon nanotube layer on a surface of the anode material layer to obtain an anode electrode; and N6: encapsulating the cathode electrode and the anode electrode in an external encapsulating shell; and N7: injecting an electrolyte solution into the external encapsulating shell.

In one embodiment, Step N2 includes the following sub-steps: providing slurry including cathode active material, conductive agent, and adhesive; and applying the slurry on the first surface of the separator by a coating method or spinning method. In other embodiments, the method for making the cathode material layer can be similar to step S1 disclosed above.

Step N3 is similar to step S2 disclosed above. In one embodiment, after the slurry is applied on the surface of the first surface of the separator, the first graphene layer and the first carbon nanotube layer can be formed on the surface of the cathode material layer after the slurry is solidified or before the slurry is solidified. In one embodiment, the first graphene layer and the first carbon nanotube layer are formed on the surface of the cathode material layer before the slurry is solidified, and then the slurry is solidified, so that the first graphene layer and the first carbon nanotube layer can combine with the cathode material layer tightly when the slurry is solidified.

In one embodiment, Step N4 is similar to step N2, but using anode active material instead of cathode active material. In another embodiment, the anode material layer is formed on the second surface of the separator by coating slurry including anode active material, conductive agent, and adhesive on the second surface.

Step N5 is similar to step N3. The second graphene layer can have the same structure as the first graphene layer. The second carbon nanotube layer can have the same structure as the first carbon nanotube layer.

Step N6 is similar to step S5 disclosed above.

Step N7 is similar to step S6 disclosed above.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for making lithium ion battery comprising:
providing a cathode material layer and an anode material layer, wherein providing the cathode material layer comprises:
providing a carbon nanotube source, a cathode active material comprising a plurality of cathode active material particles, and a solvent, wherein providing the carbon nanotube source comprises:
  providing a substrate and a carbon nanotube array formed on the substrate, wherein the carbon nanotube array comprises a plurality of carbon nanotubes, and a length of the plurality of carbon nanotubes is longer than 200 micrometers; and
  scratching the carbon nanotube array from the substrate to form the carbon nanotube source;
adding the carbon nanotube source and the cathode active material into the solvent;
agitating the solvent with the carbon nanotube source and the cathode active material with ultrasonic waves to form a mixture free of adhesive in the solvent;
depositing the mixture at a bottom of the solvent; and
separating the carbon nanotube source and the cathode active material from the solvent to obtain the cathode material layer free of adhesive;
forming a cathode current collector on a surface of the cathode material layer to obtain a cathode electrode, wherein the cathode current collector comprises a graphene layer and a carbon nanotube layer stacked with the graphene layer; the carbon nanotube layer is located on a surface of the cathode material layer, the graphene layer located on a surface of the carbon nanotube layer, and the carbon nanotube layer is sandwiched between the cathode material layer and the graphene layer; and the graphene layer comprises at least one graphene, the graphene is a one-atom-thick planar sheet of $SP^2$-bonded carbon atoms that are densely packed in a honeycomb crystal lattice, and the at least one graphene comprises a plurality of graphenes stacked with each other or located side by side;
forming an anode current collector on a surface of the anode material layer to obtain an anode electrode;
applying a separator between the cathode electrode and the anode electrode thereby forming a battery cell;
encapsulating at least one battery cell in an external encapsulating shell; and
injecting an electrolyte solution into the external encapsulating shell.

2. The method of claim 1, wherein the solvent is ethanol, glycol, acetone, N-Methyl-2-pyrrolidone, water, or combination thereof.

3. The method of claim 1, wherein a method for making the anode material layer comprises:
  providing the carbon nanotube source comprising the plurality of carbon nanotubes, an anode active material comprising a plurality of anode active material particles, and the solvent;
  adding the carbon nanotube source and the anode active material into the solvent, and agitating the solvent with the carbon nanotube source and the anode active material with ultrasonic waves; and
  separating the carbon nanotube source and the anode active material from the solvent to obtain the anode material layer.

4. The method of claim 3 wherein the anode material layer consists of the anode active material and the plurality of carbon nanotubes.

5. The method of claim 1, wherein the graphene layer is formed by:
  providing a metal substrate having a surface;
  disposing the metal substrate in a reacting chamber;
  heating the metal substrate to a predetermined temperature; and
  supplying a carbon source gas into the reacting chamber.

6. The method of claim 5, wherein a hydrogen gas is imported in the reacting chamber through a gas inlet before heating the metal substrate.

7. The method of claim 5, wherein a flow rate of the hydrogen gas is about 2 sccm, and a pressure of the reacting chamber is about 13.3 Pa.

8. The method of claim 1, wherein a method for applying the carbon nanotube layer on the surface of the graphene layer comprises:
  providing a carbon nanotube array;
  transferring the carbon nanotube array to the surface of the graphene layer; and
  pressing the carbon nanotube array.

9. The method of claim 1, wherein the battery cell is pressed using a laminator.

10. The method of claim 1, wherein the cathode material layer consists of the plurality of carbon nanotubes and the cathode active material particles.

11. The method of claim 1, wherein in the process of agitating the solvent with the carbon nanotube source and the cathode active material with ultrasonic waves, the plurality of carbon nanotubes is entangled with each other to form a net structure, and the cathode active material particles are wrapped by the net structure.

12. The method of claim 1, wherein a diameter of the plurality of cathode active material particles is less than 15 micrometers.

* * * * *